Jan. 14, 1964   E. BROKHOFF   3,117,470
INDEXING MECHANISM
Filed Sept. 25, 1961   3 Sheets-Sheet 1

INVENTOR:
Ermin Brokhoff
BY D. Emmett Thompson
HIS ATTORNEY.

Jan. 14, 1964　　　　　　　E. BROKHOFF　　　　　　3,117,470
INDEXING MECHANISM
Filed Sept. 25, 1961　　　　　　　　　　　　　　3 Sheets-Sheet 2

INVENTOR
Erwin Brokhoff
BY D. Emmett Thompson
HIS ATTORNEY.

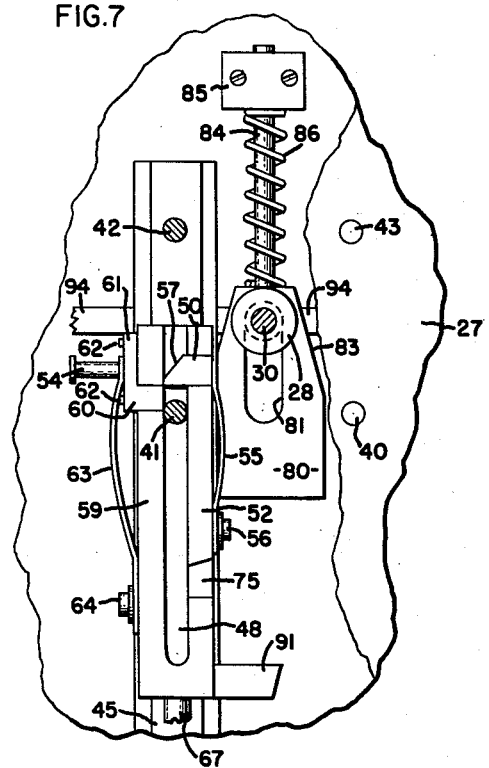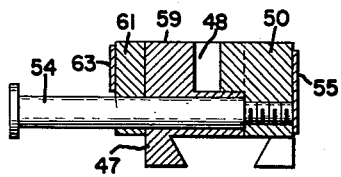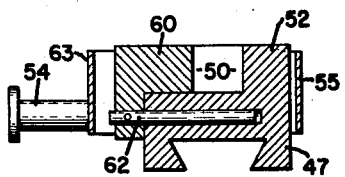

United States Patent Office 3,117,470
Patented Jan. 14, 1964

3,117,470
INDEXING MECHANISM
Erwin Brokhoff, Manlius, N.Y., assignor to Syracuse Gauge Co., Inc., Syracuse, N.Y., a corporation of New York
Filed Sept. 25, 1961, Ser. No. 140,476
2 Claims. (Cl. 74—822)

This invention relates to indexing mechanism, and has as an object a particularly simple structural arrangement, economical to construct, and which functions to index a member from one position to another and, at the conclusion of each indexing operation, to hold the indexed member against any movement without clamping, or other means, apart from the actuating mechanism effecting the indexing movement.

The invention has as a further object an indexing mechanism adapted for operation by a piston and cylinder arrangement and wherein the connection between the piston and the indexed member is by direct mechanical coupling of particularly simple and rigid design of a nature which provides for the operation of work piece clamps directly by the actuating slide of the indexing mechanism.

The invention consists in the novel features and in the combinations and constructions hereinafter set forth and claimed.

In describing this invention, reference is had to the accompanying drawings in which like characters designate corresponding parts in all the views.

In the drawings—

FIGURE 7 is a view, similar to FIGURE 4, with the slide having moved its full forward position to complete the indexing operation and shown as moved a short distance on its return stroke.

FIGURE 8 is a view taken on line 8—8, FIGURE 1.

FIGURE 9 is a view taken on line 9—9, FIGURE 1.

Figure 1:
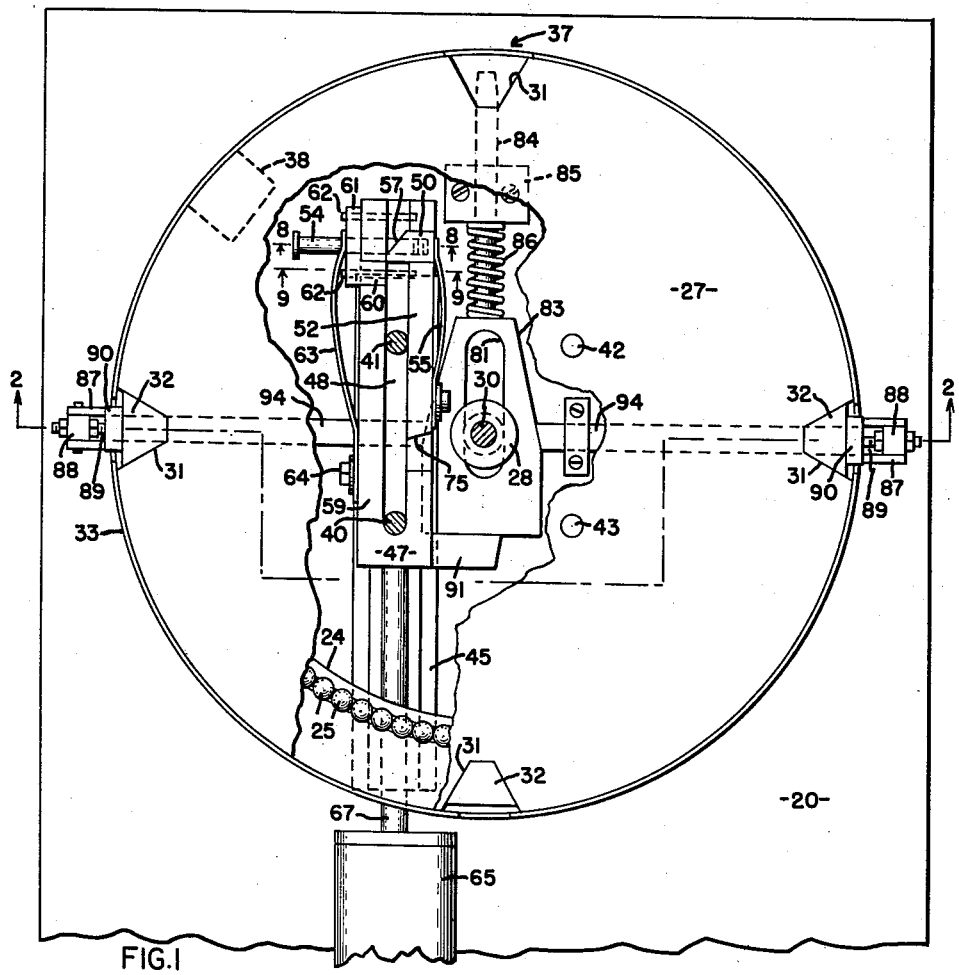
FIGURE 1 is a top plan view of an indexing mechanism embodying my invention, with parts broken away.

The indexing mechanism is illustrated as being embodied in a work piece indexing fixture, the base of which consists of a plate 20 formed on its upper surface with a circular shoulder 21. An annular member 22 is positioned on the plate 20 and is affixed thereto, as by screws 23, threading into the circular shoulder 21. The member 22 is formed with an inwardly extending flange 24 at its upper edge. The upper surface of the flange 24 is formed with a circular groove in which there is positioned a series of anti-friction balls 25. A circular turret 27 is formed on its under side with a similar groove to receive the balls 25. A post 28 is fixedly secured to the plate 20 and carries a stud 30 extending through the center of the turret disk 27.

The turret 27 is formed with a plurality of notches 31 in its peripheral portion to receive work pieces 32, these work pieces being retained in the notches 31 during the indexing movement of the turret 27 by a band 33 fixed to the member 22 and extending upwardly a short distance beyond the upper surface of the flange 24. The work pieces are positioned in the recesses 31 at a loading station 37. The member 22 is formed with a discharge slot 38 to permit finished work pieces to drop out of the recesses 31.

The turret 27 has depending from its under side a plurality of pairs of pins, there being in the arrangement shown two pairs of pins 40, 41—42, 43. The pins are spaced equally from the axis of the turret 27 and they are spaced equally in a circumferential direction.

A guide piece 45 is fixedly secured to the base 20 and is formed in its upper surface with a dove-tail guideway to slidably receive an actuating slide 47. The slide 47 is formed in its upper surface with a lengthwise extending groove 48, the groove having a length in excess of the chordal spacing between a pair of pins and being parallel with the guide piece 45. The groove 48 extends in chordal relation to the axis about which the turret is revolved, this spacing being radially from the axis to accommodate a pair of the pins, as pins 40, 41. The lower ends of the pins are positioned for movement into and out of the groove 48.

The inner end of the groove 48 is open, and a latch member 50 is mounted in the slide for movement into and out of the groove 48. In the form disclosed, the latch member 50 is mounted for sliding movement transversely toward and from the groove, in a notch formed in the inner wall 52 of the slide 47, the latch member being guided for transverse movement by a pin 54 fixedly secured in the latch member and being slidably mounted in the slide 47, see FIGURE 8. The latch is yieldingly urged inwardly by a leaf spring 55 fixed to the exterior of the wall 52, as by a screw 56. The latch member is formed with an inclined surface 57 facing towards the open end of the groove 48.

The outer wall 59 of the groove 48 is formed with a notch in which there is mounted a plug member 60 having a flange 61 overlying the outer surface of the wall 59 and being apertured to slidably move on the pin 54. The plug 60 and its flange 61 are also provided with pins 62 slidably mounted in the slide 47, see FIGURE 9. The plug 60 is positioned in adjacency to the inner surface of the latch 50 and is yieldingly urged inwardly by a leaf spring 63 secured to the outer surface of the wall 59, as by a screw 64.

Reciprocation may be imparted to the slide 47 by a piston and cylinder structure, the cylinder 65, see FIGURE 1, being fixedly secured to the base plate 20, the piston rod 67 being affixed at its inner end to the slide 47. In FIGURE 1, the slide is positioned inwardly, the bottom of the groove 48 engaging the pin 40. With fluid pressure maintained against the outer side of the piston, the slide 47 is urged against the pin 40, tending to rotate the turret 27 in a clockwise direction, FIGURE 1. However, the pin 41 is also positioned in the groove 48 and in this manner, the turret 27 is held against rotation. The turret table 27 is actually rigidly restrained against movement because of the pin 41 being urged against the inner side wall 52 of the groove under pressure by the piston.

Figure 3:
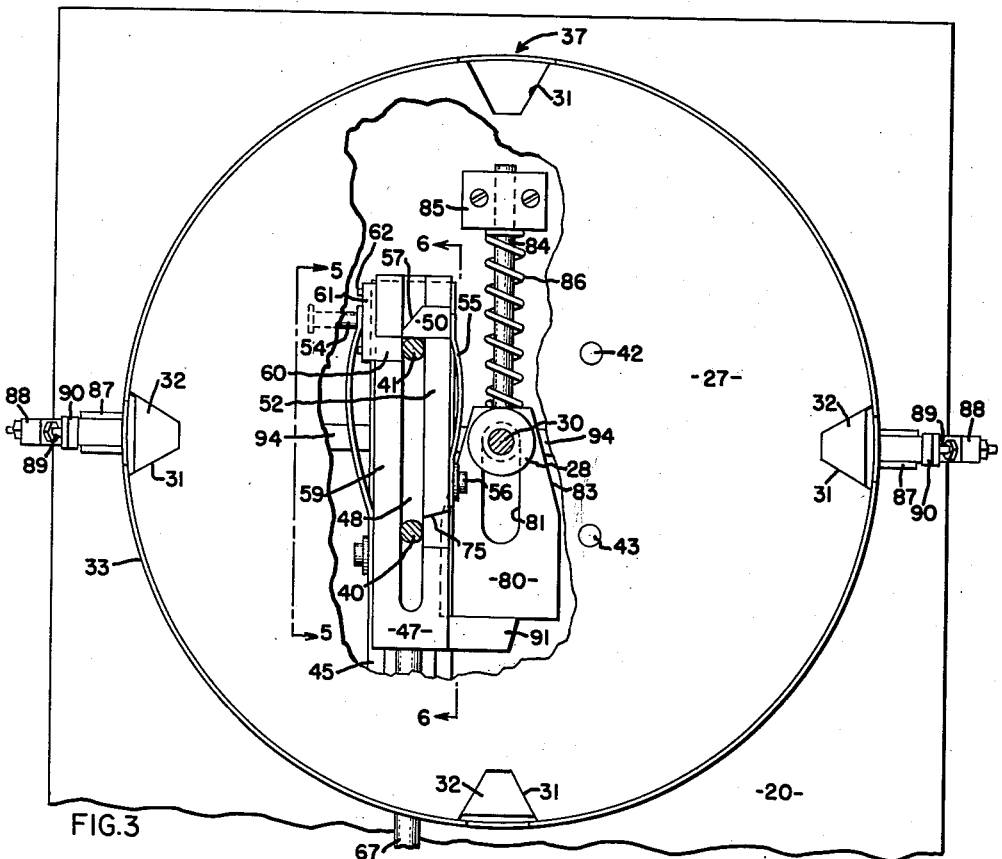
FIGURE 3 is a view, similar to FIGURE 1, with the actuating slide moved forwardly, with the slide latch engaging one of the pins carried by the indexable member.

When fluid pressure is admitted to the inner end of the cylinder 65, the piston and slide 47 are moved outwardly, moving the inner surface of the latch 50 into engagement with the pin 41, as shown in FIGURE 3. The inner side wall 52 of the groove 48 is formed with a slot 75 extending therethrough, and positioned along the groove from the latch 50 a distance equivalent to the chordal spacing between a pair of pins, whereby when the pin 41 is engaged by the latch 50, the pin 40 is positioned in registration with the slot 75.

Continued outward movement of the piston and slide will effect counter-clockwise rotation of the turret 27, the pins moving in an arcuate path, whereby the pin 41 moves outwardly against the plug 60, effecting outward movement of the plug against the action of spring 63. This resulting from the movement of the pin in its arcuate path about the axis 30. It will be apparent that the pin 40 simultaneously moves through the slot 75.

Figure 4:
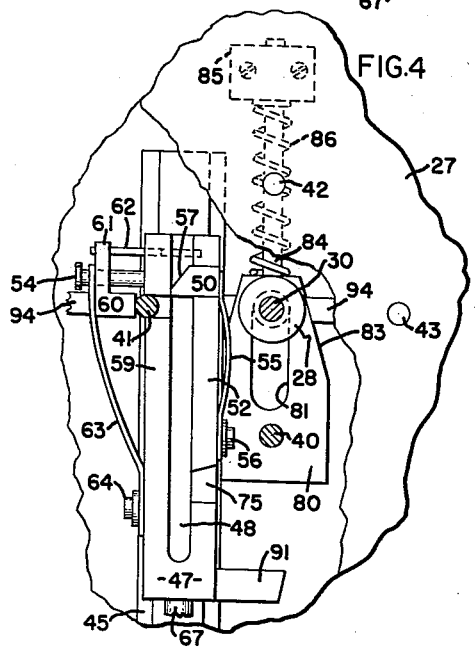
FIGURE 4 is a fragmentary view of the central portion of FIGURE 3, showing the actuating slide moved further forwardly, and with the indexed member moved to mid-position.
Figures 5, 6:
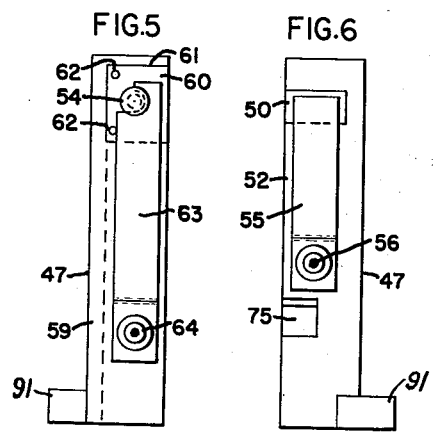
FIGURE 5 is a side elevational view of the actuating slide, the view being indicated by line 5—5, FIGURE 3.
FIGURE 6 is a similar view of the inner side of the slide indicated by the line 6—6, FIGURE 3.

FIGURE 4 illustrates the position of the parts when the pins have traveled through an arc of 45°. Upon further continued outward movement of the slide, the pin 41 moves inwardly and when the turret 27 has been indexed through an arc of 90°, the pin 41 is returned to the groove 48, as shown in FIGURE 7, in which figure the piston and the slide have been moved inwardly a short distance on the return stroke. Inasmuch as the pin 41 is now positioned in the groove 48, the next succeeding pin 42 is positioned in alignment with the groove and, upon continued inward movement of the slide, the inclined surface 57 of latch 50 will be engaged by the pin 42, and the latch moved out of the groove to permit entrance of the pin 42 into the groove. This inward movement of the slide may continue until the bottom or closed end of the groove 48 engages the pin 41. This operation is one indexing movement of the turret 27.

The bottom, or closed end, of the groove 48 need not engage a pin but, as explained above, such engagement with a pin automatically provides a clamping arrangement which functions to rigidly hold the turret against any rotary movement without the aid of additional detent, or clamping means, as conventionally used for accurately positioning index members and for holding them against rotation.

Figure 2:
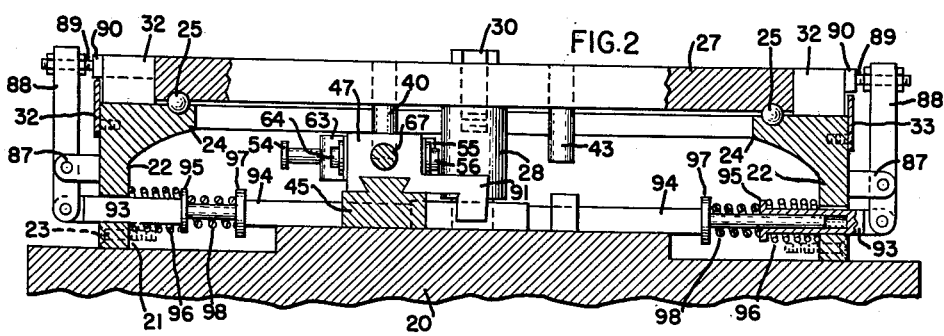
FIGURE 2 is a view taken on line 2—2, FIGURE 1.

The indexing mechanism described has the further advantage of simultaneously operating work clamping means. Such clamping means may take the simplified form disclosed in which a wedge block 80 is formed with an elongated slot 81 for sliding movement on the lower portion of the post 28. The side edges of this block are inclined, as at 83. The inner end of the block carries a stem 84 extending slidably through a guide member 85. There is a helical compression spring 86 interposed between the guide 85 and the inner end of the block 80 to yieldingly urge the block forwardly. Brackets 87 are secured to the member 22, and arms 88 are pivotally mounted in the brackets 87. Stems 89 are mounted in the upper ends of the arms 88 and carry pads 90. The brackets 87 are located at diametrically opposite sides of the member 22, whereby the pads 90 are movable into engagement with the work pieces 32 during the dwell of the turret 27, and function to securely hold the work pieces in the notches 31. The member 22 is apertured to receive rods 93 pivotally attached at their outer ends to the lower ends of the arms 88. The rods 93 are apertured to slidably receive the outer end portions of bars 94. The inner ends of the rods 93 are provided with collars 95, and a helical compression spring 96 is mounted on each rod and interposed between the collars 95 and the annular member 22, see FIGURE 2. The bars 94 are also provided with collars 97, and a higher rate spring 98 is interposed between the collars 95, 97. The inner ends of the bars 94 are formed at an angle comparable to the inclined side edges 83 of the block 80.

With this arrangement, when the block 80 is moved inwardly from the position shown in FIGURE 7 to the position shown in FIGURE 1, the bars 94 are urged outwardly, moving the upper ends of the arms 88 inwardly to move the pads 90 against the work pieces 32. The function of the springs 98 is to assure adequate clamping pressure against the work pieces prior to the engagement of the pins by the bottom or closed end of the slot 48 in the actuating slide. The function of the springs 96 is to move the upper ends of the arms 88 outwardly from the turret when the block 80 is moved forwardly by the spring 86. The block 80 is moved inwardly by a lateral projection 91 on the outer end of the slide 47.

With this arrangement, when the slide is moved inwardly from the position shown in FIGURE 7 toward the position shown in FIGURE 1, the extension 91 engages the outer end of the block 80, moving it inwardly and by its inclined edge surfaces 83, the bars 94 are urged outwardly to effect clamping of the work pieces. The arrangement is such that the work pieces are released upon the initial outward movement of the slide 47—that is, prior to the time that the inner one of the pair of pins is engaged by the latch 50.

What I claim is:

1. Mechanism for indexing a member about an axis comprising a base, said member having a plurality of pairs of pins arranged in a circular series and extending towards said base, said pins being equally spaced from said axis and equally spaced apart circumferentally about said axis, a slide formed with an elongated linear groove to receive the ends of said pins, said slide being mounted on said base for reciprocation lengthwise of said groove in a plane chordal to the circle in which said pins move to receive a pair of said pins in said groove, said groove being open at one end, a latch carried by said slide adjacent said open end and movable into and out of said groove, the wall of said groove outwardly from said axis being formed with a notch in juxtaposition to the inner side of said latch, a plug positioned in said notch and forming a continuation of said outer side wall of the groove, said plug being yieldingly movable in said notch outwardly from said groove by engagement of a pin upon rotation of said member, said slide being formed with a slot extending through the inner side wall of said groove, said slot being spaced along said groove from said latch a distance comparable to the chordal spacing of a pair of said pins, power means operable to move said slide in a direction to cause said latch to engage one pin of said pair to effect rotation of said member about said axis, said engaged pin being movable upon said rotation outwardly into said notch and thence inwardly into said groove, and the other pin of said pair being movable inwardly from said groove through said slot, the movement of said slide being sufficient to return said first pin from said notch into said groove, said latch being movable out of said groove upon engagement with the next succeeding pin of said series during return movement of said slide.

2. Indexing mechanism, a base, an indexable member journalled for rotation about an axis and having a plurality of pairs of pins arranged in a circular series and extending toward the base, said pins being equally spaced radially from said axis and being equally spaced in a circumferential direction, a slide mounted on said base and being formed with a linear groove for receiving the free ends of said pins, said groove having a length in excess of the chordal spacing between a pair of pins whereby a pair of said pins may be simultaneously positioned in said groove to restrain rotation of said indexable member when said slide is stationary, said slide being mounted on said base for reciprocation in a direction lengthwise of said groove and chordal in respect to the circle in which said pins move, said groove being open at one end, a latch carried by said slide, means yieldingly urging said latch in the open end portion of said groove, said latch being movable out of said groove upon contact by a pin entering the open end of said groove, said slide being formed with a latch in the outer side wall of said groove adjacent the inner surface of said latch, a plug in said notch forming a continuation of said outer side wall of the groove, means yieldingly restraining movement of said plug outwardly from the groove, said slide being also formed with a slot extending through the inner wall of said groove, said slot being spaced along said groove from said latch a distance comparable to the chordal spacing of a pair of pins positioned in said groove whereby, upon movement of said slide in a direction to move said latch in engagement with the first pin of a pair positioned in said groove, rotation is imparted to said indexable member, moving said engaged pin in an arcuate path outwardly of said groove into said notch and thence inwardly into said groove, and simultaneously moving the second pin of said pair inwardly through said slot, said latch being movable out of said groove upon engagement with the next succeeding pin of said series upon return movement of said slide, and power means operable to effect such reciprocation of said slide.

References Cited in the file of this patent

UNITED STATES PATENTS

| | | |
|---|---|---|
| 333,334 | Powel | Dec. 29, 1885 |
| 2,345,001 | O'Brien | Mar. 28, 1944 |
| 2,910,318 | Masur | Oct. 27, 1959 |

UNITED STATES PATENT OFFICE
CERTIFICATE OF CORRECTION

Patent No. 3,117,470                      January 14, 1964

Erwin Brokhoff

It is hereby certified that error appears in the above numbered patent requiring correction and that the said Letters Patent should read as corrected below.

Column 4, line 75, for "latch" read -- notch --.

Signed and sealed this 9th day of June 1964.

(SEAL)
Attest:

ERNEST W. SWIDER                      EDWARD J. BRENNER
Attesting Officer                      Commissioner of Patents